(12) United States Patent
Hertzog

(10) Patent No.: US 10,383,271 B2
(45) Date of Patent: Aug. 20, 2019

(54) MOULDBOARD FOR A PLOUGH

(71) Applicant: CNH Industrial Danmark A/S, Hvidovre (DK)

(72) Inventor: Daniel Nilz Fredrik Hertzog, Blackstad (SE)

(73) Assignee: CNH Industrial Danmark A/S, Hvidovre (DK)

(*) Notice: Subject to any disclaimer, the term of this patent is extended or adjusted under 35 U.S.C. 154(b) by 0 days.

(21) Appl. No.: 15/564,558

(22) PCT Filed: Mar. 31, 2016

(86) PCT No.: PCT/EP2016/057106
§ 371 (c)(1),
(2) Date: Oct. 5, 2017

(87) PCT Pub. No.: WO2016/162267
PCT Pub. Date: Oct. 13, 2016

(65) Prior Publication Data
US 2018/0084704 A1    Mar. 29, 2018

(30) Foreign Application Priority Data
Apr. 7, 2015  (DK) .............................. 2015 00211

(51) Int. Cl.
*A01B 15/08*     (2006.01)

(52) U.S. Cl.
CPC ................... *A01B 15/08* (2013.01)

(58) Field of Classification Search
CPC ................................................. A01B 15/08
See application file for complete search history.

(56) References Cited

U.S. PATENT DOCUMENTS 1,280,057 A    9/1918  McGirr
1,528,863 A *  3/1925  Walker .................. A01B 15/02
                                                    172/754

(Continued)

FOREIGN PATENT DOCUMENTS

RU    2025915 C1    1/1995
SU    1521308 A1    11/1989

*Primary Examiner* — Tara Mayo-Pinnock
(74) *Attorney, Agent, or Firm* — GableGotwals

(57) ABSTRACT

This invention relates to a mouldboard for a plough having active and passive surfaces. The active surface arranged opposite to the passive surface and has extensions in vertical and longitudinal directions. Active surface extends from an upper rim to a lower rim of the mouldboard, and, in a predetermined area, has a geometry configured existing of a number of cross-sections spaced along mouldboard's extension in longitudinal direction and intersecting upper rim of active surface and lower rim of active surface so that each cross-section on active surface in the predetermined area defines a cross-sectional curve. In respect of each cross-section and within the predetermined area of active surface, the cross-sectional curve includes upper and lower cross-sectional parts of the active surface. In respect of each cross-section within the predetermined area of active surface, the lower cross-sectional part of a particular cross-section has a smaller curvature than its corresponding upper cross-sectional counterpart of same cross-section.

20 Claims, 10 Drawing Sheets

(56) References Cited

U.S. PATENT DOCUMENTS 2,125,036 A * 7/1938 Stewart .................. A01B 15/08
                                                  172/760
3,199,610 A    8/1965 Van Der Lely
4,328,870 A * 5/1982 Karlsson ................ A01B 17/00
                                                  172/657

* cited by examiner

MOULDBOARD FOR A PLOUGH

CROSS-REFERENCE TO RELATED APPLICATIONS

This United States application is the National Phase of PCT Application No. PCT/EP2016/057106 filed 31 Mar. 2016, which claims priority to Danish Patent Application No. PA201500211 filed 7 Apr. 2015, each of which is incorporated herein by reference.

FIELD OF THE INVENTION

The present invention relates to the field of agriculture. In a first aspect the present invention relates to a mouldboard for a plough. In a second aspect the present invention relates to a plough body comprising the mouldboard of the first aspect. In a third aspect the present invention relates to a plough comprising the mouldboard of the first aspect, or comprising the plough body of the second aspect. In a fourth aspect the present invention relates to the use of the mouldboard of the first aspect, or of the plough body of the second aspect, or of the plough of the third aspect for ploughing soil.

BACKGROUND OF THE INVENTION

Within the field of agriculture ploughing has been around a long time as an effective tillage method.

Ploughing is used as a way to prepare the soil for seeding. When ploughing the soil is turned around, so that soil previously located in a certain depth will appear as a top layer of the soil. A typical ploughing depth is 18 to 20 cm, but can vary between 10 and 40 cm.

The turning of the soil upon ploughing will provide for aerating the soil and in this way will provide mineralization of soil and better drainage of water which improve fertility. Also, ploughing will remove traces of last year's crops as well as removal of any weed present on the ploughed field. In this way ploughing may be used as a mechanical weed control method, especially in ecological agriculture where herbicides are forbidden.

Ploughing is suitable for all types of soils. However, particularly soils with relatively high clay content need deeper loosening of the soil with regular intervals in order to not get too dense for optimum crop growth.

Today's ploughs comprises a frame to be towed behind or carried by a tractor or the like. The frame carries a number of plough bodies arranged inline in a direction transversal to the direction of movement through the soil in order to enable ploughing of a considerable width. Each plough body in turn comprises a mouldboard responsible for the turning of the soil. Furthermore, the plough bodies each comprise a point and a share. The point is responsible for starting the cut of the furrow. The share provides for a horizontal cut into a certain depth and thereby defines the ploughing depth.

The share and the point may be welded or bolted onto the plough mouldboard. Alternatively, the mouldboard, the share and the point may be bolted onto a bracket (frog), To turn the soil around most of today's plough's mouldboards are shaped from a plate of metal which has been bended and twisted so as to form a curved surface having cross sections defining a part of a circle circumference. Plastic and slated bodies are also common.

Such twisted geometry of a mouldboard comprising a combined circular cylinder part which has been twisted around its axial direction provides for efficient ploughing.

Accordingly this type of plough mouldboard will upon ploughing enable the soil to break loose, be lifted up on the mouldboard and moved until it has been turned around at which point it has no longer any contact with the mouldboard.

Plough bodies today are optimized for speeds up to 6 km/h±2 km/h and the manufacturer's designs are commonly not focused on saving energy consumption and wear during towing.

However in order to make agriculture more efficient, it will be desirably to be able to perform ploughing at higher speeds.

Especially at higher speeds the need for ploughs exhibiting low draft force will be needed in order to meet the need of reduce energy consumption and in order to reduce wear and tear of the plough bodies.

However, even with today's sizes of ploughs and speed of ploughing, the energy consumption is considerable and the wear and tear on the plough mouldboard is noticeable to the extent that a plough regularly needs replacement of the part of the mouldboard being submerged into the soil.

Accordingly, there exist a need for an improved mouldboard for a plough which exhibits less draft in the soil and which accordingly encounters less wear and tear so that a ploughing is possible with a reduced energy consumption and so that less frequent replacement of the mouldboard is necessary.

It is an object of the present invention to provide a mouldboard for a plough which overcomes the above-identified disadvantages.

BRIEF DESCRIPTION OF THE INVENTION

This object is achieved by a mouldboard according to the first aspect of the present invention, by a plough body according to the second aspect of the present invention, by a plough according to the third aspect of the present invention, and by a use according to the fourth aspect of the present invention.

Accordingly, in a first aspect the present invention relates to a mouldboard for a plough;

wherein said mouldboard in the orientation intended for use in a plough comprises an active surface and a passive surface;

wherein said active surface is arranged opposite to said passive surface;

wherein said active surface is having an extension in a vertical direction;

wherein said active surface is having an extension in a longitudinal direction;

wherein said active surface extending from an upper rim to a lower rim of the mouldboard;

wherein said active surface, in a predetermined area thereof, is having a geometry which is configured in such a way that there exist a number of cross-sections spaced along the mouldboard's extension in the longitudinal direction and intersecting the upper rim of said active surface and the lower rim of said active surface in such a way that each said cross-section on said active surface in said predetermined area defines a cross-sectional curve;

wherein in respect of each said cross-section and within said predetermined area of said active surface, said cross-sectional curve comprises an upper cross-sectional part and a lower cross-sectional part of said active surface;

characterized in that in respect of each said cross-section within said predetermined area of said active surface, said lower cross-sectional part of a particular cross-section is having a smaller curvature than its corresponding upper cross-sectional counterpart of the same cross-section.

In a second aspect the present invention relates to a plough body comprising a mouldboard according to the first aspect of the present invention, wherein said plough body furthermore comprises a plough share, a point, and bracket(s) for mounting the plough body on a plough frame.

In a third aspect the present invention relates to a plough comprising one or more mouldboards according to the first aspect of the present invention, or comprising one or more plough bodies according to the second aspect of the present invention in combination with a plough frame.

In a fourth aspect the present invention relates to the use of a mouldboard according to the first aspect of the present invention, or of plough body according to the second aspect of the present invention, or of a plough according to the third aspect of the present invention for ploughing soil.

The invention according to its first, second, third and fourth aspect provides for improved ploughing with less draft in the soil and which accordingly encounters less wear and tear so that a ploughing is possible with reduced energy consumption and with a less frequent requirement for replacement of the mouldboard.

DETAILED DESCRIPTION OF THE INVENTION

Figure 1:
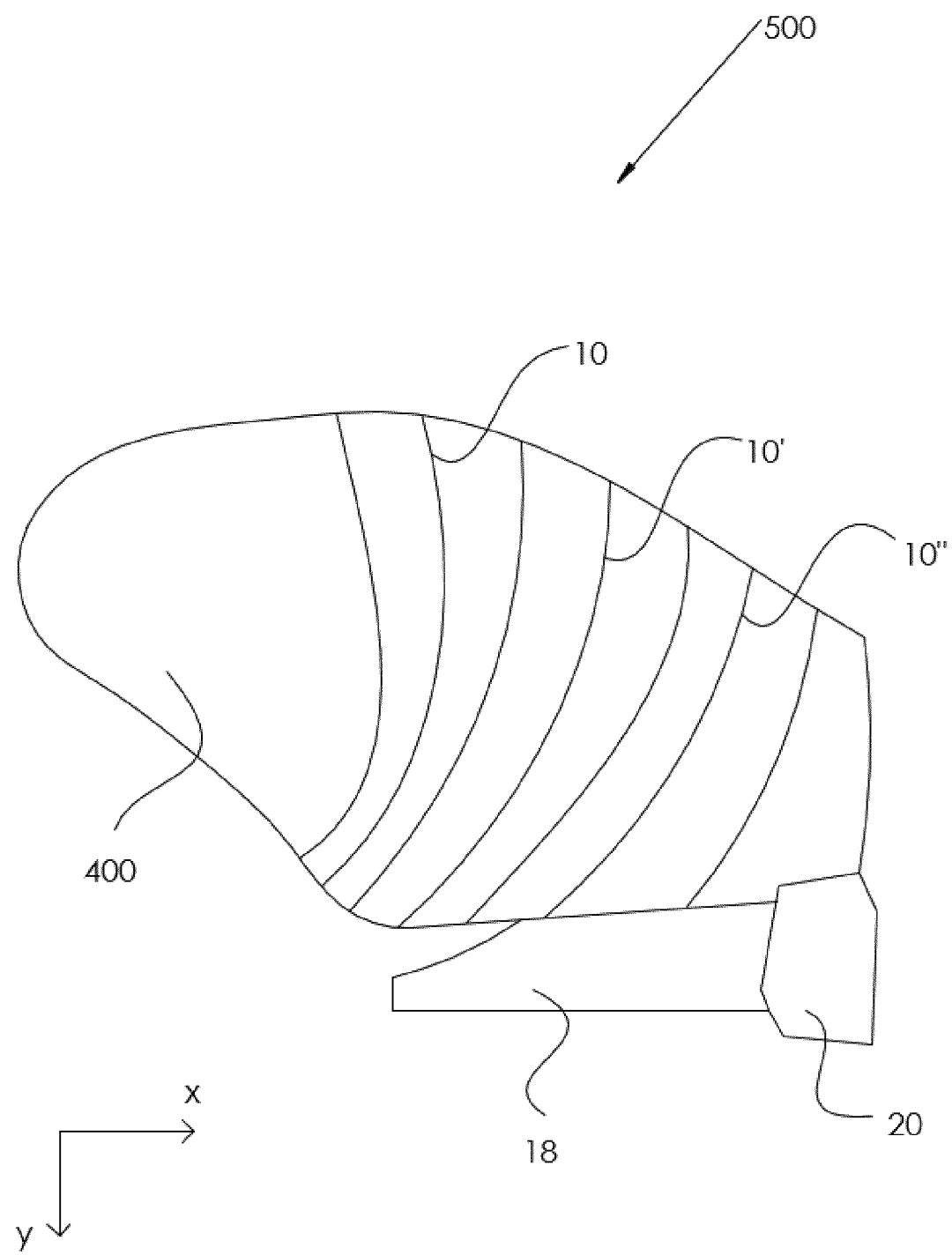
FIG. 1 is a perspective view of a prior art plough body comprising a prior art mouldboard.

The present invention relates in a first aspect to a mouldboard for a plough;
wherein said mouldboard in the orientation intended for use in a plough comprises an active surface and a passive surface;
wherein said active surface is arranged opposite to said passive surface;
wherein said active surface is having an extension in a vertical direction;
wherein said active surface is having an extension in a longitudinal direction;
wherein said active surface extending from an upper rim to a lower rim of the mouldboard;
wherein said active surface, in a predetermined area thereof, is having a geometry which is configured in such a way that there exist a number of cross-sections spaced along the mouldboard's extension in the longitudinal direction and intersecting the upper rim of said active surface and the lower rim of said active surface in such a way that each said cross-section on said active surface in said predetermined area defines a cross-sectional curve;
wherein in respect of each said cross-section and within said predetermined area of said active surface, said cross-sectional curve comprises an upper cross-sectional part and a lower cross-sectional part of said active surface;
characterized in that in respect of each said cross-section within said predetermined area of said active surface, said lower cross-sectional part of a particular cross-section is having a smaller curvature than its corresponding upper cross-sectional counterpart of the same cross-section.

Accordingly, the mouldboard according to the first aspect is having a lower curvature at a lower part, compared to the curvature at an upper part thereof.

It has surprisingly been found that such a design of a mouldboard provides for less wear and tear of the mouldboard without compromising the ploughing efficiency of the mouldboard.

In one embodiment of the mouldboard according to the first aspect of the present invention it is a requirement that in respect of each said cross-section within said predetermined area of said active surface, said upper cross-sectional part and said lower cross-sectional part at the point of transition are sharing a common tangent.

Hereby is obtained that the mouldboard at least in the predetermined area of said active surface is defining a smooth-curved surface.

In one embodiment of the mouldboard according to the first aspect of the present invention, said cross-sections being selected so as to be parallel to each other.

In one embodiment of the mouldboard according to the first aspect of the present invention said predetermined area of said active surface is having an extension in a longitudinal direction corresponding to 20% or more of the total extension of the mouldboard in a longitudinal direction, such as 30% or more, e.g. 40% or more, such as 50% or more, for example 60% or more, such as 70% or more, e.g. 80% or more, or 90% or more of the total extension of the mouldboard in a longitudinal direction, such as corresponding to the whole extension in a longitudinal direction.

In one embodiment of the mouldboard according to the first aspect of the present invention said predetermined area of said active surface is having an extension in a vertical direction corresponding to 5% or more of the total extension of the mouldboard in a vertical direction, such as 10% or more, for example 20% or more, such as 30% or more, e.g. 40% or more, for example 50% or 60% or more of the total extension of the mouldboard in a vertical direction, such as corresponding to the whole extension in a vertical direction.

In one embodiment of the mouldboard according to the first aspect of the present invention said predetermined area of said active surface is having an extension corresponding to 10% or more, such as 15% or more, for example 20% or more, such as 25% or more, for example 30% or more, such as 35% or more, for example 40% or more, such as 45% or more, for example 50% or more, such as 55% or more, for example 60% or more, such as 65% or more of the total surface area of said active surface of said mouldboard.

In one embodiment of the mouldboard according to the first aspect of the present invention it is a requirement that in respect of each of said cross-section of said predetermined area of said active surface, said curvature of said upper cross-sectional part is having a magnitude within the range of 0.0001-1.0 rad/cm, such as 0.001-0.9 rad/cm, for example 0.01-0.8 rad/cm, for example 0.05-0.7 rad/cm, such as 0.1-0.6 rad/cm, for example 0.2-0.5 rad/cm or 0.3-0.4 rad/cm.

In one embodiment of the mouldboard according to the first aspect of the present invention it is a requirement that in respect of each of said cross-section of said predetermined area of said active surface, said curvature of said upper cross-sectional part of a particular cross-section is exhibiting an increasing magnitude when following an upward direction.

In one embodiment of the mouldboard according to the first aspect of the present invention it is a requirement that in respect of each of said cross-section of said predetermined area of said active surface, said curvature of said upper cross-sectional part of a particular cross-section is exhibiting a decreasing magnitude when following an upward direction.

In one embodiment of the mouldboard according to the first aspect of the present invention it is a requirement that in respect of each of said cross-section of said predetermined area of said active surface, said upper cross-sectional part of a particular cross-section is exhibiting a maximum variation of curvature within the same cross-section of a factor 1-10, such as 2-9, for example 3-8, such as 4-7 or 5-6.

In one embodiment of the mouldboard according to the first aspect of the present invention it is a requirement that in respect of each of said cross-section of said predetermined area of said active surface, said upper cross-sectional part of a particular cross-section is exhibiting a curvature within the same cross-section which is essentially constant.

In one embodiment of the mouldboard according to the first aspect of the present invention it is a requirement in respect of each of said cross-section of said predetermined area of said active surface, said curvature of said lower cross-sectional part is having a magnitude within the range of 0-0.1 rad/cm, such as 0.0001-0.05 rad/cm, such as 0.0005-0.01 rad/cm, for example 0.001-0.005 rad/cm.

In one embodiment of the mouldboard according to the first aspect of the present invention it is a requirement that in respect of each of said cross-section of said predetermined area of said active surface, said lower cross-sectional part of a particular cross-section is exhibiting a maximum variation of curvature within the same cross-section of a factor 1-10, such as 2-9, for example 3-8, such as 4-7 or 5-6.

In one embodiment of the mouldboard according to the first aspect of the present invention it is a requirement that in respect of each cross-section of said predetermined area of said active surface, the curvature of said lower cross-sectional part of a specific cross-section is within the range of 0-25% of the curvature of said corresponding upper cross-sectional part of said specific cross-section, such as 1-24%, e.g. 2-23%, for example 3-22%, such as 4-21%, for example 5-20%, such as 6-19%, e.g. 7-18%, for example 8-17%, e.g. 9-16%, such as 10-15%, e.g. 11-14% or 12-13% of said corresponding upper cross-sectional part of said specific cross-section.

In one embodiment of the mouldboard according to the first aspect of the present invention it is a requirement that in respect of each of said cross-section of said predetermined area of said active surface, said lower cross-sectional part of a particular cross-section is exhibiting a curvature which is essentially being zero.

In one embodiment of the mouldboard according to the first aspect of the present invention it is a requirement that in respect of each cross-section of said predetermined area at least one upper cross-sectional part exist, which upper cross-sectional part is having an extension along the active surface of 5-50 cm, such as 10-45 cm, for example 15-40 cm, such as 20-35 or 25-30 cm.

In one embodiment of the mouldboard according to the first aspect of the present invention it is a requirement that in respect of each of said cross-section of said predetermined area at least one lower cross-sectional part exist, which lower cross-sectional part is having an extension along the active surface of 5-50 cm, such as 10-45 cm, for example 15-40 cm, such as 20-35 or 25-30 cm.

The above geometries of extensions of the active surface provides for a mouldboard having reduced wear and tear during ploughing without compromising the ploughing efficiency.

In one embodiment of the mouldboard according to the first aspect of the present invention it shall be understood that the notion of a "predetermined area" means that at least one cross-section of said active surface exists which cross-section fulfills the requirement as set out in claim 1.

In another embodiment of the mouldboard according to the first aspect of the present invention it shall be understood that the notion of a "predetermined area" means that in the predetermined area a number of cross-sections exist spaced along the said surface of said mouldboard's extension in the longitudinal direction, wherein any such cross-section fulfills the requirement as set out in claim 1.

In one embodiment of the mouldboard according to the first aspect of the present the geometry of the active surface is configured in such a way that the mouldboard being twisted in a longitudinal direction.

In one embodiment of this embodiment the geometry of the active surface is configured in such a way that deepest point of each curve defined by said cross-section's intersection with the active surface defines a part of an imaginary helix in the three-dimensional space.

In one embodiment of the mouldboard according to the first aspect of the present invention the geometry of the active surface is configured in such a way that at least a part of the upper rim of the active surface defines a part of a helix in the three-dimensional space; and/or in such a way that at least a part of the upper rim of the active surface defines a linear path in the three-dimensional space.

In one embodiment of the mouldboard according to the first aspect of the present invention the geometry of the active surface is configured in such a way that at least a part of the lower rim of the active surface defines a part of a helix in the three-dimensional space; and/or in such a way that at least a part of the lower rim of the active surface defines a linear path in the three-dimensional space.

These geometries provides for an efficient turning of the soil in a ploughing situation.

In one embodiment of the mouldboard according to the first aspect of the present invention it is a requirement that in respect of each cross-section of said predetermined area of said active surface, the curvature of said upper and/or lower cross-sectional part, respectively, is independently measured or defined as maximum curvatures ($C_{max}$).

In one embodiment of the mouldboard according to the first aspect of the present invention it is a requirement that in respect of each cross of said predetermined area of said active surface, the curvature of said upper and/or lower cross-sectional part, respectively, is independently measured or defined as average curvatures ($C_{ave}$).

In one embodiment of the mouldboard according to the first aspect of the present invention it is a requirement that in respect of each cross of said predetermined area of said active surface, the curvature of said upper and/or lower cross-sectional part, respectively, is independently measured or defined as absolute curvatures ($C_{abs}$).

These three embodiments define three different ways of interpreting the term "curvature".

In one embodiment of the mouldboard according to the first aspect of the present invention at least part of said predetermined area of said active surface extends to the lower rim of the active surface of said mouldboard.

In one embodiment of the mouldboard according to the first aspect of the present invention said predefined area is having an extension along said lower rim of the active surface of said mouldboard of 20 cm or more, such as 30 cm or more, for example 40 cm or more, such as 50 cm or more, e.g. 60 cm or more, such as 70 cm or more, for example 80 cm or more, such as 90 cm or more or 100 cm or more.

In one embodiment of the mouldboard according to the first aspect of the present invention at least part of said predetermined area of said active surface extends to the upper rim of the active surface of said mouldboard.

In one embodiment of the mouldboard according to the first aspect of the present invention the extension of the mouldboard in a longitudinal direction is within the range of 30-180 cm, such as 40-170 cm, e.g. 50-160 cm, such as 60-150 cm, for example 70-140 cm, such as 80-130 cm, e.g. 90-120 cm or 100-110 cm.

In one embodiment of the mouldboard according to the first aspect of the present invention it is a requirement that in respect of each of said cross-section, the extension of each cross section, along the curve defined by the intersection of said cross section with said active surface, from the upper rim to the lower rim of the mouldboard, is within the range of 20 cm or more, such as 30 cm or more, for example 40 cm or more, such as 50 cm or more, e.g. 60 cm or more, for example 70 cm or more, such as 80 cm or more, for example 90 cm or more, or 100 cm or more.

These dimensions provide for an efficient ploughing of the soil in a ploughing situation.

In one embodiment of the mouldboard according to the first aspect of the present invention said mouldboard comprises a number of through going holes for mounting of a plough share, a point and bracket(s) for mounting the plough body onto a plough frame.

In one embodiment of the mouldboard according to the first aspect of the present invention said mouldboard is being made of steel, optionally by being welding together from a number of steel parts.

In one embodiment of the mouldboard according to the first aspect of the present invention the orientations of said cross-sections is selected in such a way that they are perpendicular to the direction of movement of the mouldboard through the soil, which may even be an optimum direction of movement of the mouldboard through soil in a situation during ploughing.

Accordingly, when arranging the mouldboard on a plough frame in such a way that the direction of movement through soil, as defined by the mutual position between the mouldboard and the plough frame, is perpendicular to said cross-sections, a high ploughing efficiency, or even an optimum ploughing efficiency will result.

An optimum direction of movement of the mouldboard through soil is defined as that direction which provides for the most efficient turning of the soil with a minimum of draft of the mouldboard. A person skilled in the art will for a given mouldboard be able to identify an optimum direction of movement of the mouldboard through the soil.

In this respect, an optimum direction of movement is that specific direction of movement through the soil which provides for an optimum turning of soil and a minimum translational movement of soil at a minimum drag force, and accordingly provides for optimized efficiency as to wear and tear of the mouldboard surface as well as improved fuel economy in respect of the machinery towing the plough comprising the plough body through the soil.

In one embodiment of the mouldboard according to the first aspect of the present invention it is a requirement that in respect of each of said cross-section of said predetermined area of said active surface, said upper cross-sectional parts are exhibiting the same curvature.

The present invention relates in a second aspect to a plough body comprising a mouldboard according to the first aspect of the present invention, wherein said plough body furthermore comprises a plough share, a point, and bracket(s) for mounting the plough body on a plough frame.

The present invention relates in a third aspect to a plough comprising one or more mouldboards according to the first aspect of the present invention; or comprising one or more plough bodies according to the second aspect of the present invention, in combination with a plough frame.

In one embodiment of the plough according to the third aspect of the present invention, wherein said plough being a reversible plough or wherein said plough being a non-reversible plough.

The present invention relates in a fourth aspect to the use of a mouldboard according to the first aspect of the present invention; or of a plough body according to the second aspect of the present invention or of a plough according to the third aspect of the present invention for ploughing soil.

In the present application and in the appended claims, the following definitions are adhered to:

A longitudinal direction of a mouldboard is defined as a horizontal direction of the mouldboard when the mouldboard is oriented in an orientation optimal for ploughing and which extends in a direction along at least part of the mouldboard.

A vertical direction of a mouldboard is defined as that direction of the mouldboard when the mouldboard is oriented in an orientation optimal for ploughing and which point in the direction of gravity.

An active surface is defined as that specific surface of a mouldboard which upon ploughing in soil is in contact with the soil. Accordingly, the active surface corresponds to a leading surface of the mouldboard.

A passive surface is defined as that specific surface of a mouldboard which is arranged opposite to the active surface. Accordingly, the passive surface corresponds to a trailing surface of the mouldboard.

A lower rim of a mouldboard and/or of an active surface of a mouldboard is defined as that rim of a mouldboard which upon the intended use for ploughing fully or partly is submerged into the soil.

An upper rim of a mouldboard and/or of an active surface of a mouldboard is defined as that rim of a mouldboard which is arranged opposite to the lower rim and which upon the intended use for ploughing fully or partly points upward.

A predetermined area of the active surface is defined as an area of the active surface in respect of which a number cross-sections exist, where such cross-sections each at its intersection with the active surface of the mouldboard defines a cross-sectional curve comprises an upper cross-sectional part and a lower cross-sectional part, where for any such cross section, the lower cross-sectional part of a particular cross-sectional curve is having a smaller curvature than its corresponding upper cross-sectional counterpart of the same cross-section.

A curvature C of a point on a curve is defined as $C=\Delta\phi/\Delta S$; where C is the curvature at that specific point; $\Delta\phi$ is the change in angle of the tangent of the curve at the point when moving the distance $\Delta S$ along the curve from the point to an adjacent point located on the same curve.

A curvature of a cross-section may be defined as a maximum curvature, an average curvature, or an absolute curvature.

A maximum curvature of a cross-sectional curve is defined as the curvature of that point on the cross-sectional curve which is exhibiting the highest degree of change of angle of the tangent when following the cross-section curve to an adjacent point on the cross-sectional curve. In this way, the maximum curvature of a curve is defined as:

$$C_{max}=(\Delta\phi/\Delta S)_{max}$$

An average curvature of a cross-sectional curve is defined as the total change of angle of the tangent of the cross-sectional curve per length of the cross-sectional curve when following the cross-sectional curve from one end point of the curve to the other end point of the curve. In this way, the average curvature of a cross-sectional curve may be written as the equation:

$$Cave = \frac{\int_s d\Phi/dS}{\int_s dS}$$

where the numerator defines the total change of angle of the tangent when moving from one end point to the other end point of the cross-sectional section, whereas the denominator defines the lengths of the cross-sectional curve.

An absolute curvature of a cross-sectional curve is introduced as a means to quantitatively compare the curvature of one curve to the curvature of another curve.

Accordingly, when defining that the curvature of a lower cross-sectional part of a particular cross-section is having a smaller curvature than its corresponding upper cross-sectional counterpart of the same cross-sectional curve, measured as absolute curvature, it shall be understood that the lower cross-sectional part of the cross-sectional curve at any point is exhibiting a lower curvature than that encountered at any point of corresponding upper cross-sectional counterpart of the same cross-sectional curve.

A deepest point of a curvature of a cross-sectional curve is defined as the point on the curve exhibiting the longest projection line when being projected onto a chord section which chord section is extending along the cross-sectional curve, from an upper rim to a lower rim of the mouldboard.

A rad or a radian is defined as a unit for angle measurements. The rad is defined in such a way that a full circumference of a circle correspond to $2\pi$ rad. In this way, 1 rad=$360°/2\pi$.

A helix is defined as that curve emerging in the imaginary three-dimensional space when drawing in a two-dimensional plane, a curve which solely curves either to the left or to the right, while moving that plane in a direction having at least a component of movement perpendicular to the plane.

A helix may be a regular helix or an irregular helix.

A regular helix is a helix having a constant pitch and constant radius. I.e. a regular helix is defined as that curve emerging in the imaginary three-dimensional space when drawing in a two-dimensional plane a circle at a constant drawing speed, while moving that plane in a direction perpendicular to the plane and perpendicular to the radius of the circle at a constant speed of movement.

An irregular helix is a helix having a non-constant pitch and/or having a non-constant "radius". I.e. an irregular helix is defined as that curve emerging in the imaginary three-dimensional space when drawing in a two-dimensional plane, a curve which solely curves either to the left or to the right, which is not circular and/or while moving that plane in a direction perpendicular to the plane at a non-constant speed of movement and/or in a direction which is not perpendicular to the plane of the drawn curve.

An optimum direction of movement of a mouldboard through soil is defined as that direction of movement of the mouldboard through soil which at a predetermined speed which balances optimum ploughing efficiency one the one hand and on the other hand minimizing draft.

In one embodiment of the mouldboard according to the first aspect of the present invention, it is a feature that in respect of each said cross-section within said predetermined area A of said active surface, said lower cross-sectional part at the point of the lower rim of said mouldboard are exhibiting tangent lines, wherein said tangent lines are crossing an imaginary line at intersection points thereof.

Such feature may thereby define a turning line of soil or a soil slice when moving the mouldboard through the soil in a direction parallel to that imaginary line comprising said intersection points.

In one embodiment of the mouldboard according to the first aspect of the present invention said imaginary line is present in an area in the three-dimensional space below said lower rim of said mouldboard.

In one embodiment of the mouldboard according to the first aspect of the present invention said imaginary line defines a preferred direction of movement through soil of said mouldboard.

Moving the mouldboard in a direction parallel to that imaginary line may provide optimized ploughing efficiency.

Accordingly, when arranging the mouldboard on a plough frame in such a way that the direction of movement through soil, as defined by the mutual position between the mouldboard and the plough frame, is parallel to said imaginary line comprising said intersection points, a high ploughing efficiency, or even an optimum ploughing efficiency will result.

In one embodiment of the mouldboard according to the first aspect of the present invention said tangent lines either share a common plane; or do not share a common plane.

This embodiment implies that a lower part of the mouldboard is either planar or non-planer.

In one embodiment of the mouldboard according to the first aspect of the present invention the number of cross sections fulfilling the conditions set out in respect of the predetermined area is 3 or more, such as 5 or more, e.g. 10 or more, such as 20 or more, for example 25 or more or 50 or more.

In one embodiment of the mouldboard according to the first aspect of the present invention the spacing between each pair of adjacent cross sections independently being 2-100 cm, such as 5-90 cm, for example 10-80 cm, such as 20-70 cm, for example 30-60 cm or 40-50 cm.

These embodiments ensure that the specified conditions are fulfilled over a certain area of said predefined area and hence contribute to an efficient mouldboard over a large part of that area.

Referring now in details to the drawings for the purpose of illustrating the present invention, FIG. 1 shows a perspective view of a prior art plough body 500. The plough body comprises a mouldboard 400, a point 20 and a share 18. The mouldboard itself comprises a metal plate which has been bended so as to exhibit circular cross-sections 10,10', 10". As the mouldboard is having a circular shape as defined by the circular shaped cross-sections 10,10',10" a rather high draft is encountered upon moving the mouldboard of the plough body through soil.

Such high draft is detrimental in terms of wear and tear of the mouldboard surface as well as in fuel economy in respect of the machinery towing the plough comprising the plough body through the soil.

Figure 2A:
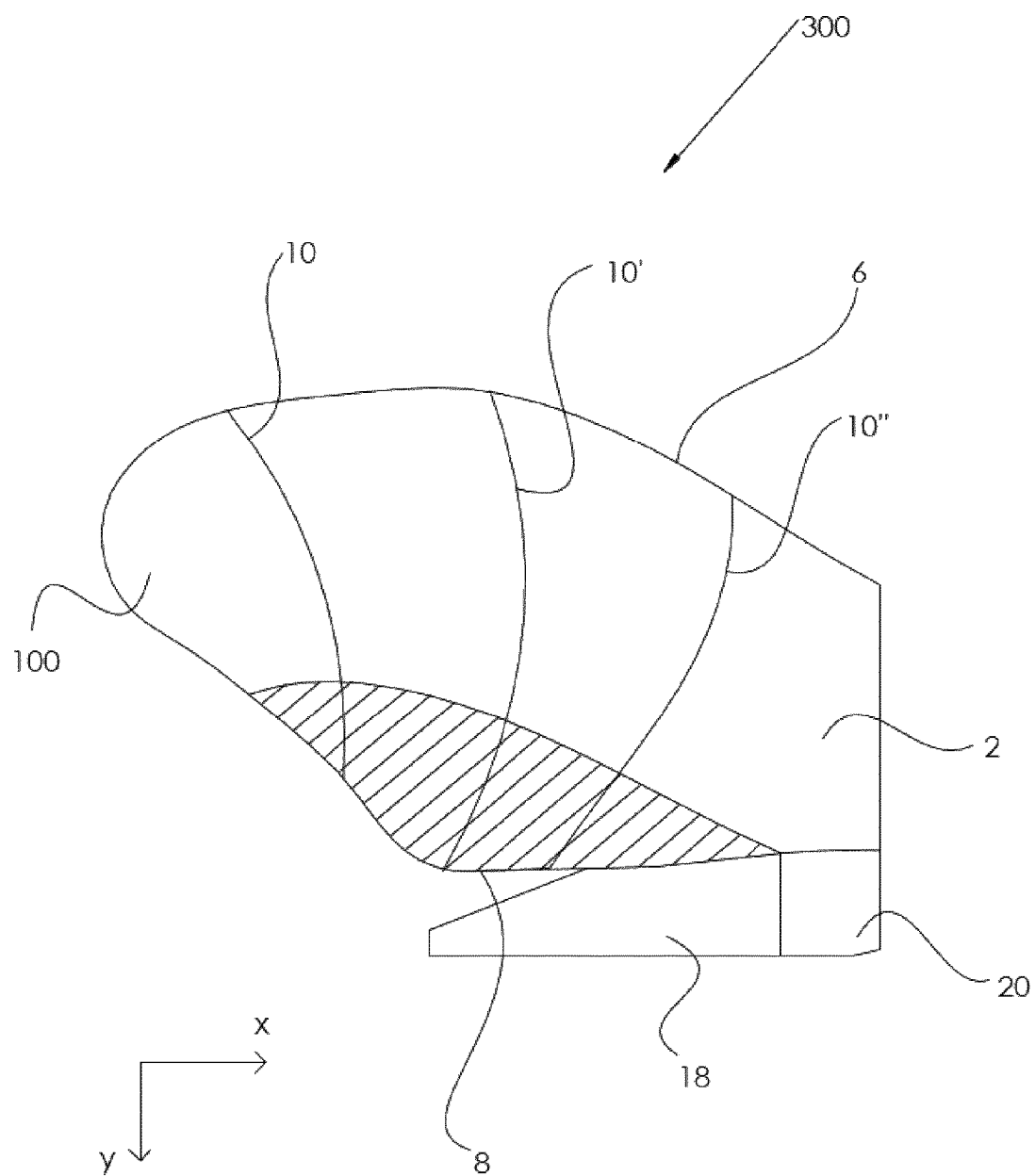
FIG. 2a is a perspective view of an example of an inventive plough body comprising an inventive mouldboard.

In contrast to this geometry of the mouldboard FIG. 2a shows a perspective view of a mouldboard 100 of a first aspect of the present invention. This mouldboard 100 is in FIG. 2a integrated into a plough body 300 further comprising a point 20 and a share 18.

The mouldboard shown in FIG. 2a is having a geometry which is configured in such a way that there exist a predetermined area on an active surface 2 of the mouldboard, in respect of which predetermined area there exist a number om cross-sectional curves 10,10',10" which are having an upper cross-sectional part having a certain curvature and a lower cross-sectional part having a smaller curvature. In FIG. 2a, the area of comprising the lower cross-sectional parts of the cross-sections is shown as the hatched area. FIG. 2a shows a special embodiment of the mouldboard according to the first aspect of the present invention in which the lower cross-sectional parts of the cross-sectional curves 10,10',10" are linear.

Figure 2B:
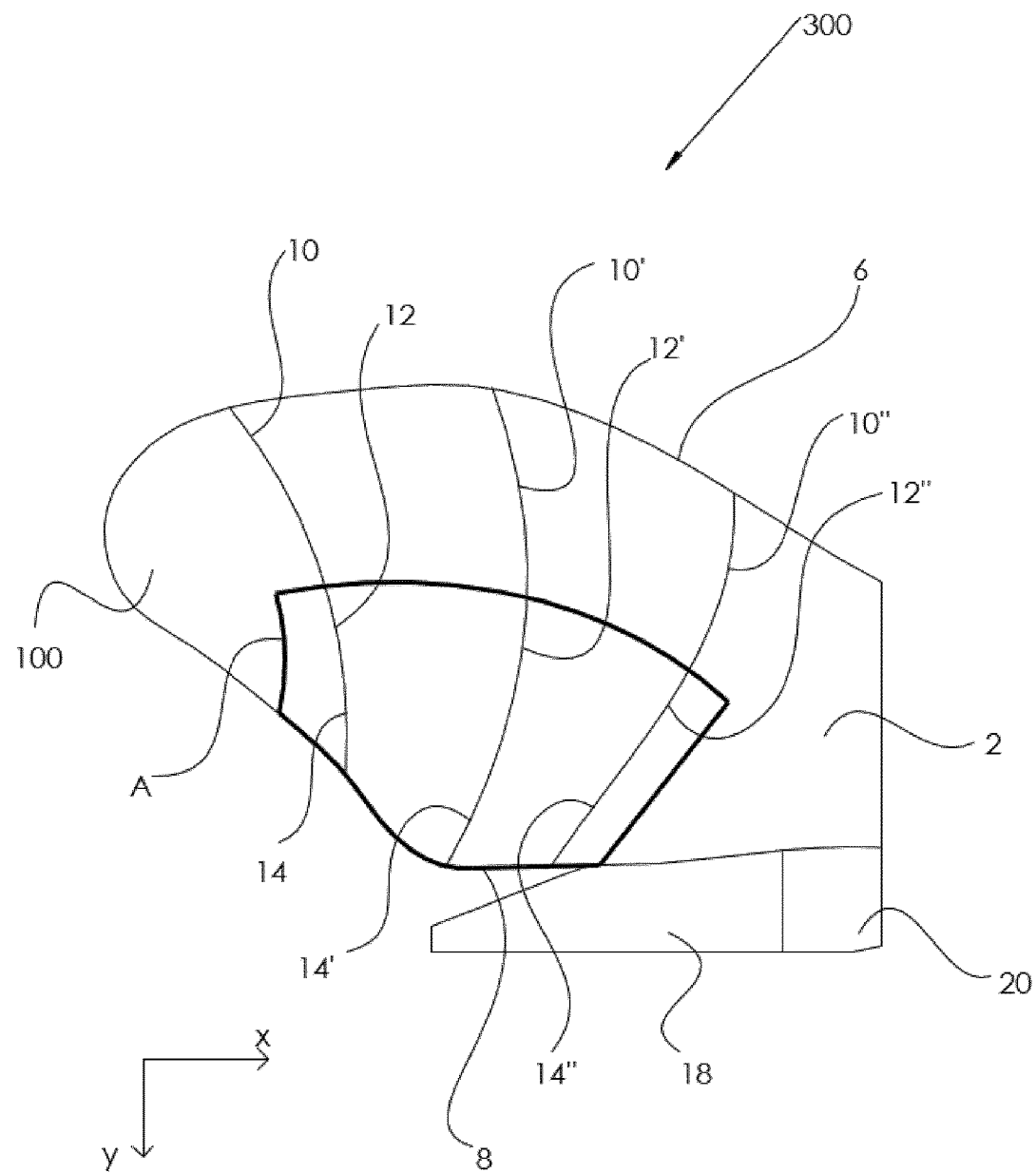
FIG. 2b is a perspective view of the plough body of FIG. 2a showing the upper and lower cross-sectional parts of a predefined area of the mouldboard.

Further technical features of a mouldboard according to the first aspect of the present invention are illustrated in respect of a similar mouldboard in FIG. 2b.

FIG. 2b shows a perspective view of a ploughbody 300 according to a second aspect of the present invention. The plough body comprises a mouldboard 100, a point 20 and a share 18.

The mouldboard 100 comprises in the orientation intended for use in a plough an active surface 2 and a passive surface 4 (not seen in FIG. 2b). The passive surface 4 is arranged opposite to the active surface 2. In the mouldboard 100 the active surface is having an extension in a vertical direction Y and is having an extension in a longitudinal direction X.

The active surface is extending from an upper rim 6 to a lower rim 8 of the mouldboard.

The active surface comprises a predetermined area A thereof (shown in FIG. 2b as the bold-lined area), and this predetermined area is having a geometry which is configured in such a way that a number of cross-sectional curves 10,10',10" spaced along the mouldboard's extension in the longitudinal direction X exist, where each of these cross-sectional curves extend from an upper rim 6 of said active surface to a lower rim 8 of said active surface;

The geometry of the cross-sectional curves 10,10',10" in the predetermined area A of the active surface 2 is configured in such a way that each said cross-sectional curve comprises an upper cross-sectional part 12,12',12" and a lower cross-sectional part 14,14',14".

The mouldboard 100 according to the first aspect of the present invention is characterized in that in respect of each said cross-sectional curves 10,10',10" within said predetermined area A of said active surface, said lower cross-sectional part 14,14',14" of a particular cross-section is having a smaller curvature C than its corresponding upper cross-sectional counterpart 12,12',12" of the same cross-sectional curve 10,10',10".

It has surprisingly been found that providing a mouldboard with a lower curvature at a lower part, compared to the curvature of the upper part of the mouldboard provides for less wear and tear of the mouldboard surface as well as improved fuel economy in respect of the machinery towing the plough comprising the plough body through the soil.

The notion of introducing the term "predefined area" simply is a way to state that at a certain percentage of the total surface area of the active surface 2 of the mouldboard 100 there exist cross-sectional parts 12,12',12",14,14',14", on the surface 2 in respect of which the lower cross sectional parts 14,14',14" are having a less curvature that their corresponding upper counterparts 12,12',12". Accordingly, this condition of variation of curvature does not necessarily apply to the whole of the active surface of the mouldboard.

Accordingly, in one embodiment of the first aspect of the present invention, said predetermined area A of said active surface 2 is having an extension in a longitudinal direction X corresponding to 20% or more of the total extension of the mouldboard in a longitudinal direction.

Alternatively, in one embodiment of the first aspect of the present invention, said predetermined area A of said active surface 2 is having an extension in a vertical direction Y corresponding to 5% or more of the total extension of the mouldboard in a vertical direction.

In a still alternative embodiment of the first aspect of the present invention, said predetermined area A of said active surface 2 is having an extension corresponding to 10% or more of the total surface area of said active surface of said mouldboard.

The lower cross sectional parts 14,14',14" and the upper cross-sectional parts 12,12',12" of as specific cross-sectional curve on the active surface 2 of the mouldboard accordingly join somewhere on the cross-sectional curves 10,10',10". The exact joining point may not be unambiguously defined as long as the cross-section comprises upper and lower cross-sectional parts fulfilling the requirement of presence of relative lower and higher curvature, respectively.

Accordingly, in respect of a specific cross-sectional curve on the active surface 2 of the mouldboard and within the predefined area, there may be chosen various points joining the lower cross sectional parts 14,14',14" and the upper cross-sectional parts 12,12',12" of that specific cross-sectional curve.

It is preferred that such points joining the lower cross sectional parts 14,14',14" and the upper cross-sectional parts 12,12',12" of that specific cross-section at the point of joining or transition PT from the upper to the lower cross-sectional part or vice versa are sharing a common tangent T.

In a mathematical sense this means that the cross-sectional curve 10 at the point PT joining the lower cross sectional parts 14 and the upper cross-sectional parts 12 is being "differentiable".

Figure 4:
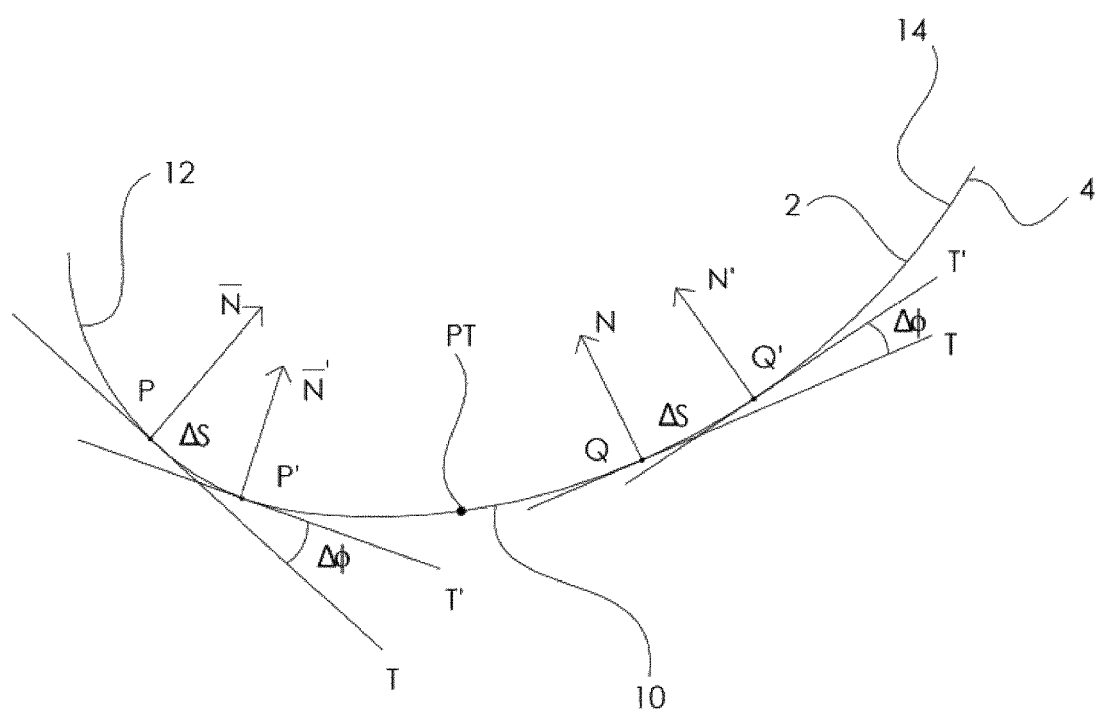
FIG. 4 is a plan view illustrating the concept of degree of curvature of a cross-sectional part of a cross-section as used in the present invention.

The concept of curvature as used in the present description and in the appended claims is illustrated in FIG. 4.

FIG. 4 shows a cross-sectional curve 10 comprising an upper, relatively highly curved upper cross-sectional part 12 and a relatively less curved lower cross-sectional part 14.

The relatively highly curved upper cross-sectional curve 12 comprises a point P. The tangent T at the point P is having a normal N.

Next to the point P on the relatively highly curved upper cross-sectional curve 12 is located the point P'. The tangent T' at the point P' is having a normal N'.

The curvature C(P) at point P on the relatively highly curved upper cross-sectional curve 12 is defined as $$C(P) = \Delta\phi/\Delta S;$$

where C(P) is the curvature at point P; Δϕ is the change in angle of the tangent when moving the distance ΔS along the curve 12 from point P to point P'.

FIG. 4 also shows that the relatively less curved lower cross-sectional curve 14 comprises a point Q. The tangent T at the point Q is having a normal N.

Next to the point Q on the relatively less curved lower cross-sectional curve 14 is located the point Q'. The tangent T' at the point Q' is having a normal N'.

The curvature C(Q) at point Q on the relatively less curved lower cross-sectional curve 14 is defined as $$C(Q) = \Delta\phi/\Delta S;$$

where C(Q) is the curvature at point Q; Δϕ is the change in angle of the tangent when moving the distance ΔS along the curve 14 from point Q to point Q'.

It is seen that this change in angle of the tangent in respect of point Q is less than the corresponding change in angle of the tangent in respect of point P.

As the distance ΔS is the same for the distance along the curve 12 between point P and P' on the one hand, and for the distance along the curve 14 between point Q and Q' on the other hand, it follows that C(Q)<C(P).

The above sections relates to the definition of a curvature of a curve at a point on the curve as used in the present description and in the appended claims.

However, when comparing the curvature between different parts of a cross-sectional curve, other terms may be used throughout the present description and the appended claims.

Accordingly, when defining that the curvature C of a lower cross-sectional part 14,14',14" of a particular cross-section is having a smaller curvature C than its corresponding upper cross-sectional counterpart 12,12',12" of the same cross-section 9,9',9", the curvature may be measured as an average curvature, or as a maximum curvature, or as an absolute curvature.

The average curvature, $C_{ave}$ along the distance ΔS of a curve is defined as:

$$C_{ave} = \frac{\int_s d\Phi/dS}{\int_s dS}$$

This equation expresses that the average curvature along the distance ΔS of the curve is defined as the ratio: the total change in the angle of the tangent of the curve when moving from a starting point to an ending point: the total distance ΔS along the curve.

The maximum curvature of a curve is defined as:

$$C_{max} = (\Delta\phi/\Delta S)_{max}$$

meaning the ratio: the change in angle of the tangent when moving the distance ΔS along the curve: the distance ΔS, at the point exhibiting the greatest such change in angle of tangent.

Finally, throughout the present description and the appended claims, when comparing curvatures of two different curve parts, the curvature C may be measured as absolute curvature, $C_{abs}$.

Accordingly, when defining that the curvature C of a lower cross-sectional part 14,14',14" of a particular cross-section is having a smaller curvature C than its corresponding upper cross-sectional counterpart 12,12',12" of the same cross-sectional curve 10,10',10", measured as absolute curvature, it shall be understood that no point of the lower cross-sectional part 14,14',14" is exhibiting a greater curvature than any point of corresponding upper cross-sectional counterpart 12,12',12" of the same cross-sectional curve 10,10',10".

FIG. 4 also shows a point PT defining (one of many) points which may separate/join the relatively highly curved upper cross-sectional curve 12 and a relatively less curved lower cross-sectional curve 14 of the cross-sectional curve 10.

In one embodiment of the first aspect of the present invention it is preferred that in respect of each of said cross-section 10,10',10" of said predetermined area A of said active surface 2, said curvature C of said upper cross-sectional part 12,12',12" is having a magnitude within the range of 0.0001-1.0 rad/cm.

It may be beneficial in one embodiment of the first aspect of the present invention to configure the mouldboard in such a way that in respect of each of said cross-section 10,10',10" of said predetermined area A of said active surface 2, said curvature C of said upper cross-sectional part 12,12',12" of a particular cross-section is exhibiting an increasing magnitude when following an upward direction.

In this way the mouldboard becomes more and more curved upon going in a direction from the lower rim 8 to the upper rim 6.

In respect of a particular cross-section 10,10',10" of said predetermined area A of said active surface 2, said upper cross-sectional part 12,12',12" may be exhibiting a maximum variation of curvature C of a factor 1-10, such as 2-9, for example 3-8, such as 4-7 or 5-6.

It may also be beneficial in one embodiment of the first aspect of the present invention to configure the mouldboard in such a way in respect of each of said cross-sectional curves 10,10',10" of said predetermined area A of said active surface 2, said upper cross-sectional part 12,12',12" of a particular cross-section is exhibiting a curvature within the same cross-section which is essentially constant.

In this way the mouldboard is exhibiting circular cross-sections 10,10',10". At least in a part thereof.

In one embodiment of the first aspect of the present invention it is preferred that in respect of each of said cross-section 10,10',10" of said predetermined area A of said active surface 2, said curvature C of said lower cross-sectional part 14,14',14" is having a magnitude within the range of 0-0.1 rad/cm.

Preferably the curvature C of said lower cross-sectional part 14,14',14" is very small, e.g. less than 0.01 rad/cm.

In respect of a particular cross-sectional curve 10,10',10" of said predetermined area A of said active surface 2, said lower cross-sectional part 14,14',14" may be exhibiting a maximum variation of curvature C of a factor 1-10, such as 2-9, for example 3-8, such as 4-7 or 5-6.

In another embodiment it is preferred that the mouldboard is configured in such a way that in respect of each cross-section 10,10',10" of said predetermined area A of said active surface 2, the curvature C of said lower cross-sectional part 14,14',14" of a specific cross-section is within the range of 0-25% of the curvature C of the corresponding upper cross-sectional part 12,12',12" of said specific cross-section.

In a particularly preferred embodiment the mouldboard is configured in such a way that in respect of each of said cross-section 10,10',10" of said predetermined area A of said active surface 2, said lower cross-sectional part 14,14',14" of a particular cross-section is exhibiting a curvature C which is essentially being zero.

In this way a lower section of the mouldboard, or at least a part thereof, may be exhibiting a linear or even a planar configuration.

Figure 3:
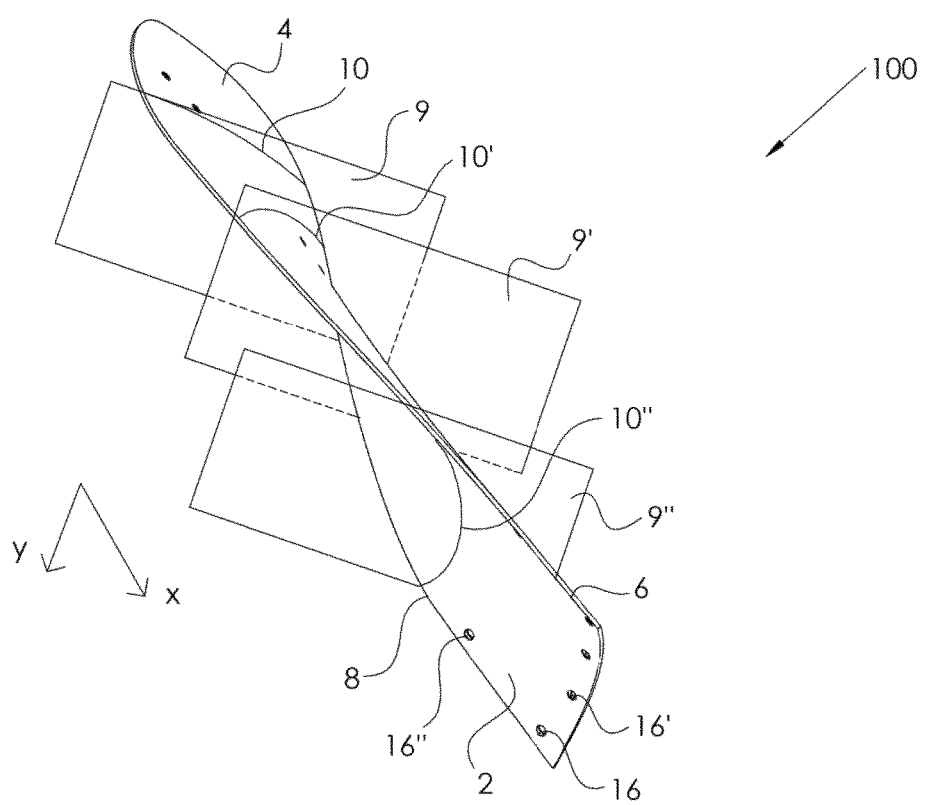
FIG. 3 is a perspective view of a mouldboard according to the present invention and illustrating the concept of cross-sections as used in the present invention.

The concept of introducing cross-section is illustrated in FIG. 3. FIG. 3 shows a mouldboard 100 according to the first aspect of the present invention.

The mouldboard 100 comprises an active surface 2 and a passive surface 4. The active surface extends from an upper rim 6 to a lower rim 8 of the mouldboard.

A number of imaginary cross-sections 9,9',9" are spaced along the mouldboard's extension in the longitudinal direction X and extending from the upper rim 6 of said active surface to the lower rim 8 of said active surface 2.

Each cross-section 9,9',9" on the active surface 2 defines a cross-sectional curve 10,10',10".

It is seen in FIG. 3 that all said cross-section 9,9',9" are being selected so as to be parallel to each other.

Other arrangements of the orientation of the cross-sections are possible.

It may be advantageous that the mouldboard according to the first aspect of the present invention is having a geometry of the active surface 2 in such a way that the mouldboard is being twisted in a longitudinal direction X.

Accordingly, in one embodiment of the first aspect of the present invention, the geometry of the active surface 2 is configured in such a way that deepest point DP of each curve defined by each cross-section's 10,10',10" intersection with the active surface 2 defines a part of an imaginary helix H in the three-dimensional space.

Figure 5:
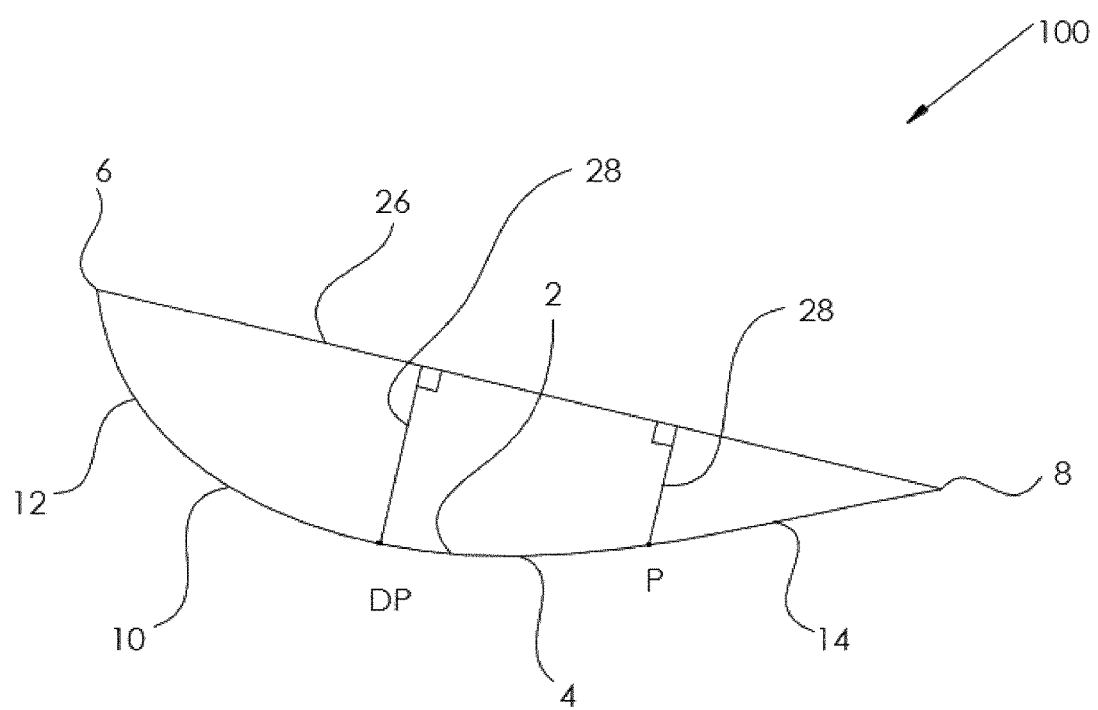
FIG. 5 is a plan view illustrating the concept of deepest point of curvature as used in the present invention.

The concept of the deepest point DP of a curve defined by one cross-section's 10,10',10" intersection with the active surface 2 is illustrated in FIG. 5.

FIG. 5 shows a cross-sectional section of the mouldboard 100, where a cross-section 9 defined a cross-sectional curve 10 having an upper part 12 and a lower part 14. The cross sectional curve 10 extends from an upper rim 6 to a lower rim 8 of the mouldboard. A chord section 26 is defined as a straight lined section extending from the upper rim 6 to the lower rim 8 of the mouldboard. The mouldboard is having an active surface 2 and an opposite passive surface, The deepest point DP of a cross sectional curve 10 is defined as the point P on the curve 10 exhibiting the longest projection line 28 when being projected onto the chord section 26, extending along the cross section 9.

In FIG. 5 it is seen that the point DP is exhibiting a longer projection line 28 compared to all other point P along the cross-sectional curve 10.

A cross-sectional curve 10 in respect of a specific cross-section 9 may exhibit more than one deepest point DP. In that case, at least one of the deepest points DP of each curve defined by each cross-section's 10,10',10" intersection with the active surface 2 defines a part of an imaginary helix H in the three-dimensional space.

In other embodiments it may be advantageous that the geometry of the active surface 2 is configured in such a way that at least a part of the upper rim 6 of the active surface 2 defines a part of a helix H in the three-dimensional space; and/or in such a way that at least a part of the upper rim 6 of the active surface 2 defines a linear path in the three-dimensional space.

In still other embodiments it may be advantageous that the geometry of the active surface 2 is configured in such a way that at least a part of the lower rim 8 of the active surface 2 defines a part of a helix H in the three-dimensional space; and/or in such a way that at least a part of the lower rim of the active surface 2 defines a linear path in the three-dimensional space.

The twisted or helical structure of a mouldboard 100 according to the first aspect of the present invention is illustrated in FIG. 3.

Figure 6:
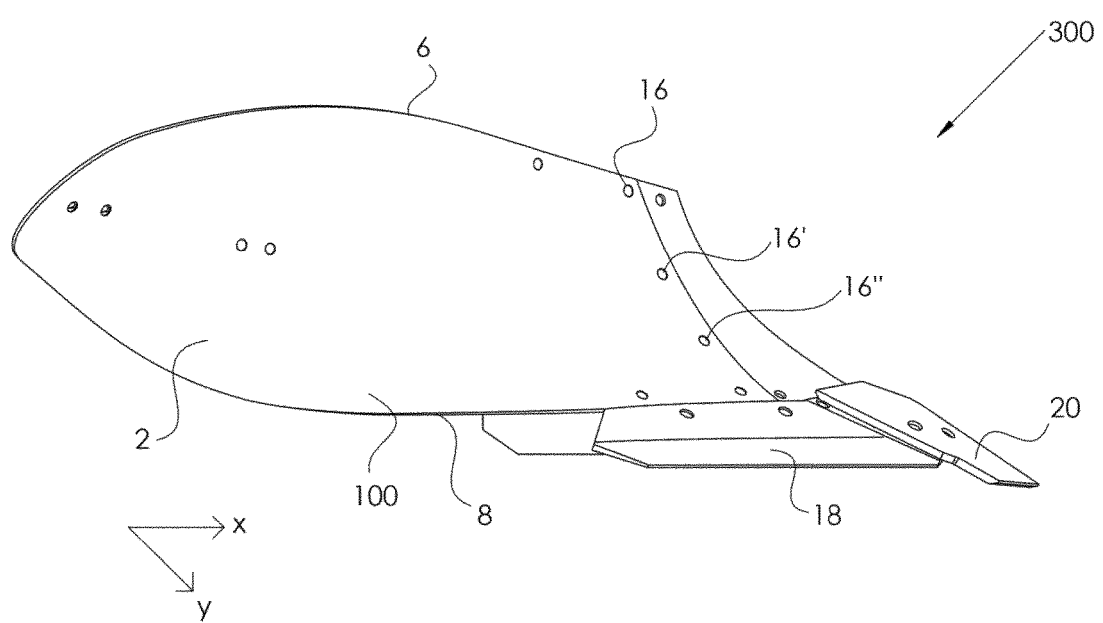
FIG. 6 is a perspective view illustrating a plough body comprising a mouldboard according to the present invention.

FIG. 6 illustrates in a perspective view a plough body 300 according to a second aspect of the present invention. The plough body 300 comprises a mouldboard 100 of the first aspect of the present invention in combination with a point 20 and a share 18. The plough body illustrated in FIG. 6 is ready to be mounted onto a plough frame 24 (not shown in FIG. 6).

Figure 9:
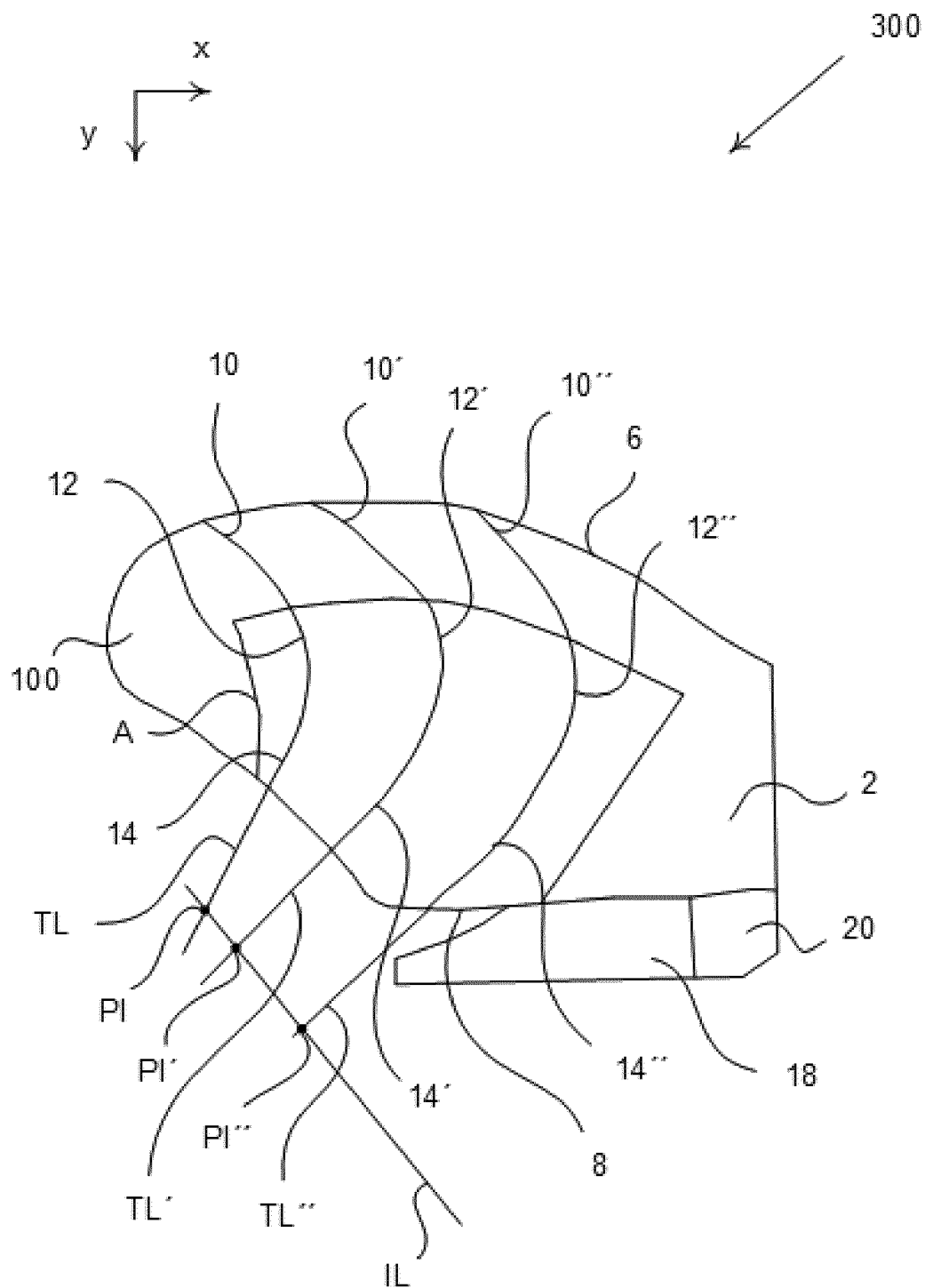
FIG. 9 is a perspective view of a another embodiment of the mouldboard according to the present invention.

In FIG. 9 is illustrated a preferred embodiment of a mouldboard for a plough. FIG. 9 shows a perspective view of a plough body 300 comprising a mouldboard 100, a point 20 and a share 18.

The mouldboard 100 comprises in the orientation intended for use in a plough an active surface 2 and a passive surface 4 (not seen in FIG. 9). The passive surface 4 is arranged opposite to the active surface 2. In the mouldboard 100 the active surface is having an extension in a vertical direction Y and is having an extension in a longitudinal direction X.

The active surface is extending from an upper rim 6 to a lower rim 8 of the mouldboard.

The active surface comprises a predetermined area A thereof (shown in FIG. 9 as the bold-lined area), and this predetermined area is having a geometry which is configured in such a way that a number of cross-sectional curves 10,10',10" spaced along the mouldboard's extension in the longitudinal direction X exist, where each of these cross-sectional curves extend from an upper rim 6 of said active surface to a lower rim 8 of said active surface;

FIG. 9 shows the upper cross-sectional parts 12,12',12" and a lower cross-sectional part 14,14',14" of the cross-sectional curves 10,10',10".

Also seen in FIG. 9 is lower cross-sectional part 14,14',14" of the cross-sectional curves 10,10',10" at the point of the lower rim 8 defines tangent lines TL,TI',TL".

These tangent lines TL,TL,TL" will, at points of intersection PI,PI',PI", cross an imaginary line IL arranged in the three-dimensional space below the lower rim 8 of the mouldboard 100.

It has surprisingly been found that this specific design of the mouldboard will provide for efficient ploughing efficiency in that this design will provide for an optimum turning of soil and a minimum translational movement of soil at a minimum drag force, and accordingly provides for optimized ploughing efficiency as to wear and tear of the mouldboard surface as well as improved fuel economy in respect of the machinery towing the plough comprising the plough body through the soil.

This is especially true in case the direction of movement of the mouldboard through the soil is defined by the imaginary line IL in such a way that the mouldboard is being moved through soil in a direction parallel to the direction of the imaginary line IL.

In the present description and in the appended claims many of the various embodiments are referred to as defining specific features relating to the predetermined area A. It should be noted, however, that when referring to a combination of specific embodiments as set out in the claims, such combinations may refer to one area in respect of one embodiment and another area in respect of another embodiment. Hence, the area A referred to may be the same or different when referring to a combination of embodiments as set out in the claims.

In the present description and in the appended claims the term "essentially" are used in order to compensate for inaccuracies as a result of imprecise manufacturing processes and hence encompasses usual tolerances encountered within the art of manufacturing mouldboards, plough bodies and ploughs.

EXAMPLE

A prior art mouldboard from the manufacturer Kverneland Model No. 28 and not according to the present invention was applied on the active surface thereof a single coat of spray paint Mark Paint Ritol and allowed to dry for 2 hours.

This mouldboard comprises an active surface essentially comprising circular cross sections arranged normal to the direction of travel. The circular cross-sections extend from an upper rim to a lower rim of the mouldboard.

Another mouldboard which had a geometry according to the present invention was applied with a single coat of the same paint on the active surface of the mouldboard and allowed to dry for the same period of time. This mouldboard comprises an active surface comprising cross sections normal to the direction of travel, where these cross-section comprise curves with different curvature on the upper and lower part of the mouldboard, the lower curvature being smaller than the upper curvature.

The two mouldboards were mounted onto a plough frame along with four other mouldboards.

The mouldboards were dragged through 500 m of light clay soil at a ploughing depth of 22 cm and an average speed of 8 km/h.

Subsequently the mouldboards were raised from the soil and inspected visually.

Figure 7:
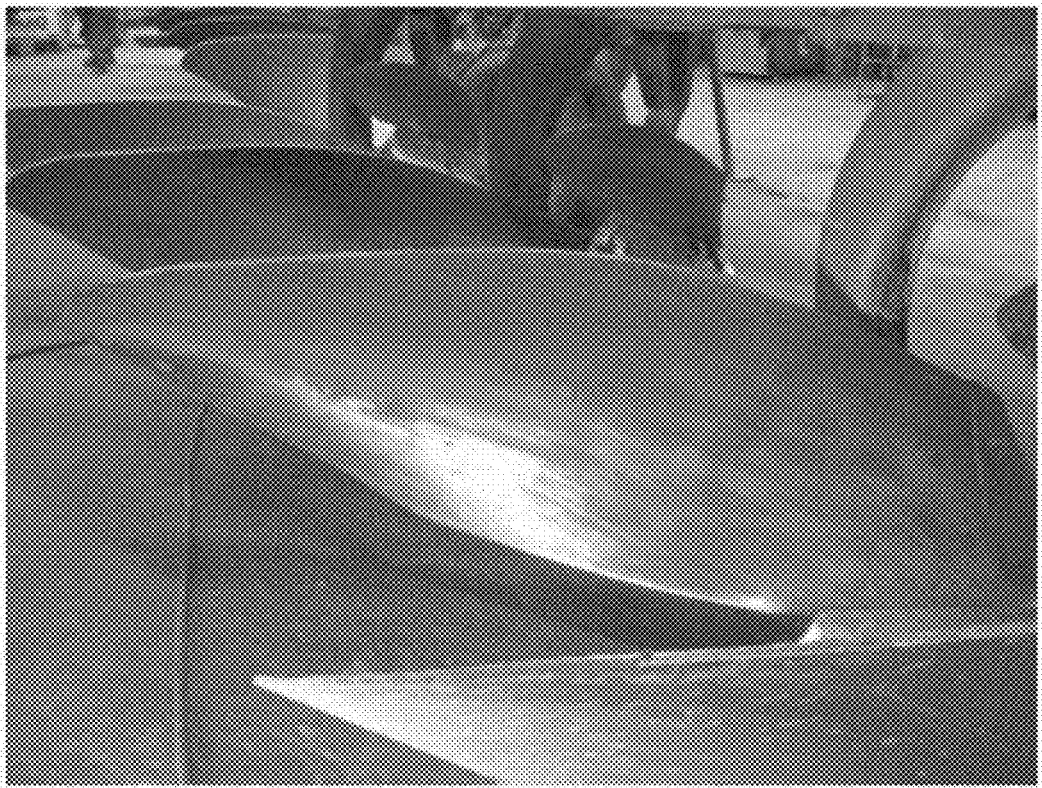
FIG. 7 is a photo illustrating the abrasive action of soil of a prior art mouldboard after ploughing.

FIG. 7 shows a photo of the prior art Kverneland mouldboard immediately after this ploughing.

Figure 8:
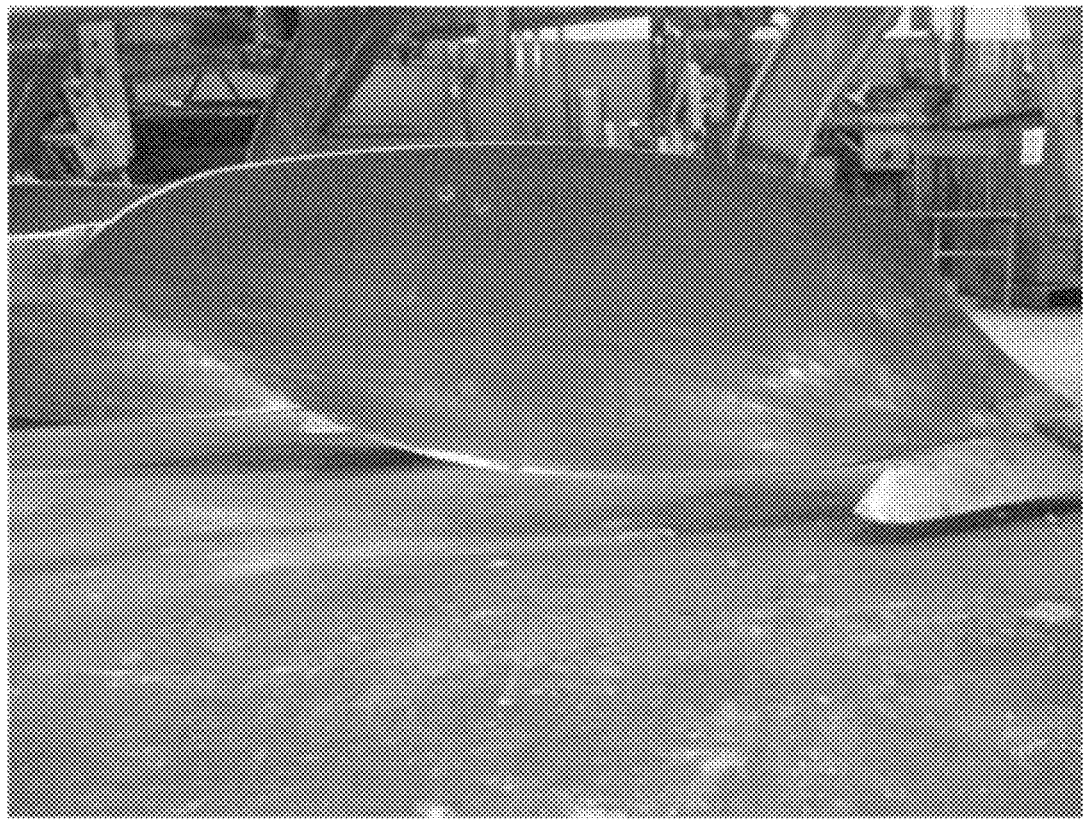
FIG. 8 is a photo illustrating the abrasive action of soil of mouldboard according to the present invention after ploughing.

FIG. 8 shows a photo of mouldboard of the present invention immediately after this ploughing It can clearly be seen that the prior art mouldboard in FIG. 7 has been subjected to more abrasive action from the soil, compared to the inventive mouldboard of FIG. 8 in that it appears clearly that more paint has come off in respect of the prior art mouldboard.

The plough furrows obtained were inspected visually as well. No difference in ploughing quality could be detected. The two different mouldboards tested gave the same furrow width, turning of soil and ploughing quality.

The conditions for the plough bodies during the test was exactly the same, the only thing that differed was the plough body geometry. Accordingly, the difference in abrasive effect can be attributed solely to the different geometries of the two mouldboards.

This example accordingly illustrates that an improved mouldboard can be provided having an improved geometry which encounters less wear and tear originating from abrasive contact with soil, and hence less draft, without compromising ploughing quality.

LIST OF REFERENCE NUMERALS

2 Active surface of mouldboard
4 Passive surface of mouldboard
6 Upper rim of mouldboard
8 Lower rim of mouldboard
9,9',9" Cross section
10,10',10" Cross-sectional curve of active surface of mouldboard
12,12',12" Upper cross-sectional part of cross-sectional curve of active surface
14,14',14" Lower cross-sectional part of cross-sectional curve of active surface
16,16',16" Through-going holes in mouldboard
18 Plough share of plough body
20 Point of plough body
Mounting brackets of plough
22 Plough frame
26 Chord section between upper rim and lower rim of mouldboard along a cross-section thereof
28 Projection line
100 Mouldboard for a plough
200 Plough
300 Plough body
400 Prior art mouldboard for a plough
500 Prior art plough body for a plough
A Predetermined area of active surface
C Curvature of cross-section
DP Deepest point of cross section
H Helix
N,N' Normal of point on cross-section
P Point on cross-section
PT Point of transition between upper and lower cross-sectional part
Q Point on cross-section
ΔS Distance along cross-section between two points on cross-section
T,T' Tangent to cross-section at a point
X Longitudinal direction
Y Vertical direction
IL Imaginary line
PI,PI',PI" Point of intersection
TL,TL',TL" Tangent line

The invention claimed is:
1. A mouldboard (100) for a plough (200);
wherein said mouldboard in the orientation intended for use in a plough comprises an active surface (2) and a passive surface (4);
wherein said active surface (2) is arranged opposite to said passive surface (4);
wherein said active surface has an extension in a vertical direction (Y);
wherein said active surface has an extension in a longitudinal direction (X);
wherein said active surface extends from an upper rim (6) to a lower rim (8) of the mouldboard;
wherein said active surface, in a predetermined area (A) thereof, has a geometry which is configured in such a way that there exist a number of cross-sections (9,9',9") spaced along the mouldboard's extension in the longitudinal direction (X) and intersecting the upper rim (6) of said active surface and the lower rim (8) of said active surface (2) in such a way that each said cross-section (9,9',9") on said active surface (2) in said predetermined area (A) defines a cross-sectional curve (10,10',10");
wherein in respect of each said cross-section and within said predetermined area (A) of said active surface (2), said cross-sectional curve (10,10',10") comprises an upper cross-sectional part (12,12',12") and a lower cross-sectional part (14,14',14") of said active surface;

characterized in that in respect of each said cross-section within said predetermined area (A) of said active surface, said lower cross-sectional part (14,14',14") of a particular cross-section has a smaller curvature (C) than its corresponding upper cross-sectional counterpart (12,12',12") of the same cross-section (9,9',9");

wherein in respect of each said cross-section (9,9',9") within said predetermined area (A) of said active surface (2), said lower cross-sectional part (14,14',14") at the point of the lower rim (8) of said mouldboard exhibits tangent lines (TL, TL', TL"), wherein said tangent lines (TL, TL', TL") crosses an imaginary line (IL) at intersection points (PI, PI', PI") thereof.

2. A mouldboard (100) according to claim 1, wherein in respect of each said cross-section (9,9',9") within said predetermined area (A) of said active surface (2), said upper cross-sectional part (12,12',12") and said lower cross-sectional part (14,14',14") at the point of transition (PT) share a common tangent.

3. A mouldboard (100) according to claim 1, wherein said cross-sections (9,9',9") is selected so as to be parallel to each other.

4. A mouldboard (100) according to claim 1, wherein in respect of each of said cross-sections (9,9',9") of said predetermined area of said active surface (2), said curvature (C) of said upper cross-sectional part (12,12',12") is selected from the group consisting of: a magnitude within a range of 0.0001-1.0 rad/cm; and wherein in respect of each of said cross-sections (9,9',9") of said predetermined area (A) of said active surface (2), said curvature (C) of said lower cross-sectional part (14,14',14") is selected from the group consisting of: a magnitude within the range of 0-0.1 rad/cm.

5. A mouldboard (100) according to claim 1, wherein in respect of each of said cross-sections (9,9',9") of said predetermined area (A) of said active surface (2), said upper cross-sectional part (12,12',12") of a particular cross-section exhibits a maximum variation of curvature (C) within the same cross-section of a factor selected from the group consisting of: 1-10; and/or wherein in respect of each of said cross-sections (9,9',9") of said predetermined area (A) of said active surface (2), said lower cross-sectional part (14, 14',14") of a particular cross-section exhibits a maximum variation of curvature (C) within the same cross-section of a factor selected form the group consisting of 1-10.

6. A mouldboard (100) according to claim 1, wherein the geometry of the active surface (2) is configured in such a way that the mouldboard being twisted in a longitudinal direction (X).

7. A mouldboard (100) according to claim 6, wherein the geometry of the active surface (2) is configured in such a way that deepest point (DP) of each curve defined by said cross-section's (9,9',9") intersection with the active surface (2) defines a part of an imaginary helix (H) in the three-dimensional space.

8. A mouldboard (100) according to claim 6, wherein the geometry of the active surface (2) is configured in such a way that at least a part of the upper rim (6) of the active surface (2) defines a part of a helix (H) in the three-dimensional space; or in such a way that at least a part of the upper rim (6) of the active surface (2) defines a linear path in the three-dimensional space.

9. A mouldboard (100) according to claim 6, wherein the geometry of the active surface (2) is configured in such a way that at least a part of the lower rim (8) of the active surface (2) defines a part of a helix (H) in the three-dimensional space; or in such a way that at least a part of the lower rim of the active surface (2) defines a linear path in the three-dimensional space.

10. A mouldboard (100) according to claim 1, wherein in respect of each cross-section (9,9',9") of said predetermined area (A) of said active surface (2), the curvature (C) of said upper cross-sectional part and/or lower cross-sectional part (12,12',12",14,14',14"), respectively, independently is defined by at least one selected from the group consisting of: maximum curvatures ($C_{max}$); average curvatures ($C_{ave}$); or absolute curvatures ($C_{abs}$).

11. A mouldboard (100) according to claim 1, wherein at least part of said predetermined area (A) of said active surface extends to the lower rim (8) of the active surface (2) of said mouldboard.

12. A mouldboard (100) according to claim 1, wherein at least part of said predetermined area (A) of said active surface (2) extends to the upper rim (6) of the active surface of said mouldboard.

13. A mouldboard (100) according to claim 1, wherein said mouldboard comprises a number of through going holes (16,16'16") for mounting of a plough share (18), a point (20) and bracket(s) (22) for mounting the plough body onto a plough frame (24).

14. A mouldboard (100) according to claim 1, wherein the orientations of said cross-sections are selected in such a way that they are perpendicular to an optimum direction of movement of the mouldboard through soil in a situation during ploughing.

15. A mouldboard (100) according to claim 1, wherein said imaginary line (IL) is present in an area in the three-dimensional space below said lower rim (8) of said mouldboard.

16. A mouldboard (100) according to claim 1, wherein said imaginary line (IL) defines a preferred direction of movement through soil of said mouldboard.

17. A mouldboard (100) according to claim 1, wherein said tangent lines (TL,TL',TL") share a common plane; or wherein said tangent lines (TL,TL',TL") do not share a common plane.

18. A plough body (300) comprising a mouldboard (100) according to claim 1, wherein said plough body furthermore comprises a plough share (18), a point (20), and bracket(s) (22) for mounting the plough body on a plough frame (24).

19. A plough (200) comprising one or more mouldboards (100) according to claim 1, or comprising one or more plough bodies (300) according to claim 18 in combination with a plough frame (24).

20. A plough (200) according to claim 19, wherein said plough is a reversible plough or wherein said plough being a non-reversible plough.

* * * * *